(12) United States Patent
Wang et al.

(10) Patent No.: US 11,044,744 B2
(45) Date of Patent: Jun. 22, 2021

(54) METHOD FOR TRANSMITTING AND RECEIVING DOWNLINK CONTROL SIGNALLING, APPARATUS, BASE STATION AND TERMINAL

(71) Applicant: ZTE CORPORATION, Guangdong (CN)

(72) Inventors: Yuxin Wang, Shenzhen (CN); Yu Ngok Li, Shenzhen (CN); Peng Hao, Shenzhen (CN); Zhaohua Lu, Shenzhen (CN); Yijian Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 93 days.

(21) Appl. No.: 16/323,597

(22) PCT Filed: Jul. 25, 2017

(86) PCT No.: PCT/CN2017/094325
§ 371 (c)(1),
(2) Date: May 2, 2019

(87) PCT Pub. No.: WO2018/028427
PCT Pub. Date: Feb. 15, 2018

(65) Prior Publication Data
US 2019/0297639 A1    Sep. 26, 2019

(30) Foreign Application Priority Data
Aug. 12, 2016  (CN) .......................... 201610670187.5

(51) Int. Cl.
*H04W 4/00*      (2018.01)
*H04W 72/12*    (2009.01)
*H04W 72/04*    (2009.01)

(52) U.S. Cl.
CPC ....... *H04W 72/1289* (2013.01); *H04W 72/04* (2013.01); *H04W 72/1205* (2013.01)

(58) Field of Classification Search
CPC ............. H04W 72/1289; H04W 72/04; H04W 72/1205; H04W 72/046; H04W 72/042;
(Continued)

(56) References Cited

U.S. PATENT DOCUMENTS 10,034,278 B2 *  7/2018  Larsson ............ H04W 72/0453
2012/0057562 A1  3/2012  Kim et al.
(Continued)

FOREIGN PATENT DOCUMENTS

CN     101795145 A    8/2010
CN     103004106 A    3/2013
(Continued)

OTHER PUBLICATIONS

International Search Report and Written Opinion for International Appl. No. PCT/CN2017/094325 dated Oct. 17, 2017.
(Continued)

*Primary Examiner* — Chuong T Ho
(74) *Attorney, Agent, or Firm* — Foley & Lardner LLP

(57) ABSTRACT

Disclosed is a method and apparatus for sending and receiving downlink control signalling, a base station and a terminal. The method includes that a base station sends downlink control signalling carrying indication information to a terminal. The indication information in the downlink control signalling at least includes one of: information for indicating a receiving manner to the terminal, reference signal resource information referenced for calculating downlink scheduling information, reference signal resource information referenced for calculating uplink scheduling information, or allocation information of a resource block.

17 Claims, 2 Drawing Sheets

A base station sends downlink control signalling carrying indication information to a terminal, where the indication information in the downlink control signalling at least includes one of: information for indicating a receiving manner to the terminal, reference signal resource information referenced for calculating downlink scheduling information, reference signal resource information referenced for calculating uplink scheduling information, or allocation information of a resource block — 101

(58) Field of Classification Search
CPC ............ H04W 72/14; H04W 72/1231; H04W 72/085; H04B 7/0695; H04L 5/0048; H04L 5/0053
USPC .................................................. 370/329, 330
See application file for complete search history.

(56) References Cited

U.S. PATENT DOCUMENTS

| | | | |
|---|---|---|---|
| 2013/0121185 A1 | 5/2013 | Li et al. | |
| 2013/0182683 A1 | 7/2013 | Seol et al. | |
| 2015/0003384 A1* | 1/2015 | Kawasaki | H04L 5/0078 370/329 |
| 2015/0163794 A1* | 6/2015 | Liang | H04W 72/0413 370/329 |
| 2016/0087771 A1 | 3/2016 | Noh et al. | |
| 2016/0183231 A1 | 6/2016 | Shi et al. | |
| 2017/0331573 A1* | 11/2017 | Li | H04W 72/1289 |
| 2018/0048358 A1* | 2/2018 | Li | H04B 7/0617 |
| 2020/0008090 A1* | 1/2020 | Chen | H04L 5/0048 |

FOREIGN PATENT DOCUMENTS

| | | | |
|---|---|---|---|
| CN | 105490791 A | | 4/2016 |
| EP | 3 282 594 A1 | | 2/2018 |

OTHER PUBLICATIONS

European Search Report for EP Appl. No. 17838557.1, dated Feb. 25, 2020.
Huawei: "Downlink control signaling for dual-layer beamforming", 3GPP Draft; RI-091793 Downlink Control Signaling for Dual-Layer Beamforming, 3rd Generation Partnership Project (3GPP), Mobile Competence Centre; 650, Route Des Lucioles; F-06921 Sophia-Antipolis Cedex; France, vol. TSG RAN, No. San Francisco, US; May 4, 2009-May 8, 2009, May 2, 2009 (May 2, 2009), XP050597451, [retrieved on May 2, 2009].
Interdigital Communications: "Beam-based aspects for New Radio", 3GPP Draft; R2-164121 (NR SI A194325 Beam-Based Aspects), 3rd Generation Partnership Project (3GPP), Mobile Competence Centre; 650, Route Des Lucioles; F-06921 Sophia-Antipolis Cedex; France, vol. RAN WG2, No. Nanjing, China, May 23, 2016-May 27, 2016 May 22, 2016 (May 22, 2016), XP051105438, Retrieved from the Internet: URL: http://www.3gpp.org/ftp/Meetings 3GPPSYNC/RAN2/Docs/ [retrieved on May 22, 2009].
Examination Report for EP Appl. No. 17838557.1 dated Mar. 9, 2021.

* cited by examiner

101 — A base station sends downlink control signalling carrying indication information to a terminal, where the indication information in the downlink control signalling at least includes one of: information for indicating a receiving manner to the terminal, reference signal resource information referenced for calculating downlink scheduling information, reference signal resource information referenced for calculating uplink scheduling information, or allocation information of a resource block

FIG. 1

201 — A terminal receives downlink control signalling carrying indication information sent by a base station, where the indication information in the downlink control signalling at least includes one of: information for indicating a receiving manner to the terminal, reference signal resource information referenced for calculating downlink scheduling information, reference signal resource information referenced for calculating uplink scheduling information, or allocation information of a resource block

FIG. 2

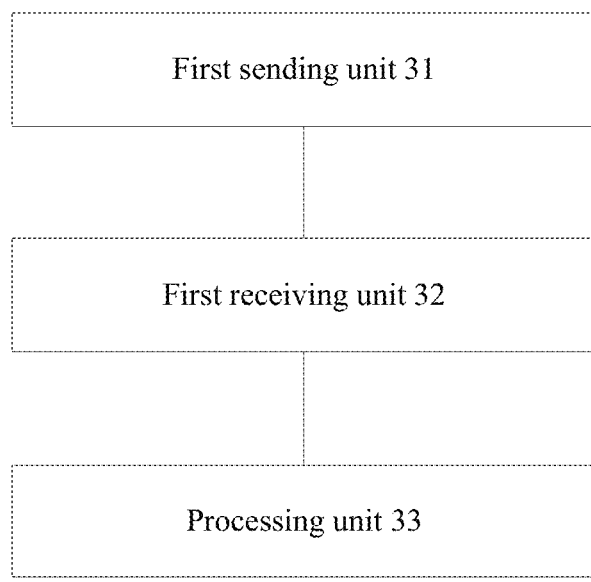

FIG. 3

METHOD FOR TRANSMITTING AND RECEIVING DOWNLINK CONTROL SIGNALLING, APPARATUS, BASE STATION AND TERMINAL

CROSS-REFERENCE TO RELATED APPLICATIONS

This is a National Stage Application, under 35 U.S.C. 371, of International Patent Application No. PCT/CN2017/094325, filed on Jul. 25, 2017, which claims priority to Chinese Patent Application No. 201610670187.5, filed on Aug. 12, 2016, contents of both of which are incorporated herein by reference in their entireties.

TECHNICAL FIELD

The present application relates to, but is not limited to, mobile communication technologies and, in particular, relates to a method and apparatus for sending and receiving downlink control signalling, a base station and a terminal.

BACKGROUND

In Long Term Evolution (LTE), a physical downlink control channel (PDCCH) is used for bearing uplink and downlink scheduling information and uplink power control information. The downlink control information (DCI) formats include DCI formats 0, 1, 1A, 1B, 1C, 1D, 2, 2A, 3, 3A; and DCI formats 2B, 2C, and 2D are later added to an evolved LTE-A Release 12 to support a variety of different applications and transmission modes. A base station (evolved-Node-B, eNB) may configure a terminal (user equipment, UE) through the downlink control information, or the UE is configured by high layers, which is also referred to as being configured with the high-layer signalling.

A sounding reference signal (SRS) is a signal used between the terminal and the base station for measuring radio channel state information (CSI). In the LTE system, the UE periodically sends an uplink SRS on the last data symbol of a send subframe according to parameters, indicated by the eNB, such as a frequency band, a frequency domain position, a sequence cyclic shift, a period, and a subframe offset. The eNB determines the uplink CSI of the UE according to the received SRS, and performs operations such as frequency domain selection scheduling and closed loop power control according to the obtained CSI.

In a study of LTE-A Release 10 (LTE-A Release 10), it is proposed that in uplink communication, a non-precoded SRS, that is, an antenna-specific SRS should be used, while a demodulation reference signal (DMRS) used for demodulation in a physical uplink shared channel (PUSCH) is precoded. The base station can estimate original uplink CSI by receiving the non-precoded SRS, while cannot estimate the original uplink CSI through the precoded DMRS. At this time, when the UE sends the non-precoded SRS by using multiple antennas, more SRS resources are required by each UE, which results in a decrease in the number of UEs that can be simultaneously reused in the system. The UE can send the SRS in two triggering manners, that is, through the high-layer signalling (also referred to as the trigger type 0) or the downlink control information (also referred to as the trigger type 1). A periodic SRS is triggered based on the high-layer signalling, and a non-periodic SRS is triggered based on the downlink control information. In LTE-A Release 10, a manner of non-periodic sending of SRS is added, which improves the utilization rate of SRS resources to some extent and improves the flexibility of resource scheduling.

With the development of communication technologies, the demand for data services is increasing and available low-frequency carriers are in short supply. Therefore, high-frequency (30 to 300 GHz) carrier communication which has not been fully utilized has become an important communication way of achieving high-speed data communication in the future. The high-frequency carrier communication has a large available bandwidth and can provide effective high-speed data communication. However, a big technical challenge for the high-frequency carrier communication is that high-frequency signals fade significantly in space compared with low-frequency signals. Although this will cause spatial fading losses when the high-frequency signals are used for outdoor communication, the shorter wavelength of the high-frequency signals usually allows using more antennas. Therefore, the communication is implemented based on beams to compensate the spatial fading losses.

However, when the number of antennas increases, each antenna needs a set of radio frequency links, and digital beamforming thus brings about an increase in costs and a loss in power. Therefore, current studies tend to hybrid beamforming, that is, a final beam formed by radio frequency beams together with digital beams.

SUMMARY

The following is a summary of the subject matter described herein in detail. This summary is not intended to limit the scope of the claims.

In a study of the new radio access technology, for the high-frequency communication system, the base station is provided with a large number of antennas to form downlink transmission beams for compensating the spatial fading of the high-frequency communication, and the terminal is also provided with a large number of antennas to form uplink transmission beams. At this time, the SRS is also sent in the form of a beam. In order to reduce resource overhead of downlink pilots and reduce the feedback of UEs in the downlink transmission, time division duplex (TDD) systems often use channel reciprocity to calculate downlink scheduling information by measuring the SRS. The downlink scheduling information includes modulation and coding schemes, precoding weights, and the like. Since the downlink scheduling information may be calculated based on SRSs of different beams, the terminal cannot know which optimal receiving beam is used to receive data in the downlink transmission.

Embodiments of the present disclosure provide a method and apparatus for sending and receiving downlink control signalling, a base station and a terminal.

An embodiment of the present disclosure provides a method for sending downlink control signalling, including: sending, by a base station, downlink control signalling carrying indication information to a terminal, where the indication information in the downlink control signalling at least includes one of: information for indicating a receiving manner to the terminal, reference signal resource information referenced for calculating downlink scheduling information, reference signal resource information referenced for calculating uplink scheduling information, or allocation information of a resource block.

Another embodiment of the present disclosure provides a method for receiving downlink control signalling, including:

receiving, by a terminal, downlink control signalling carrying indication information sent by a base station, where the indication information in the downlink control signalling at least includes one of: information for indicating a receiving manner to the terminal, reference signal resource information referenced for calculating downlink scheduling information, reference signal resource information referenced for calculating uplink scheduling information, or allocation information of a resource block.

An embodiment of the present disclosure provides an apparatus for sending downlink control signalling, applied to a base station and including a first sending unit.

The first sending unit is configured to send downlink control signalling carrying indication information to a terminal, where the indication information in the downlink control signalling at least includes one of: information for indicating a receiving manner to the terminal, reference signal resource information referenced for calculating downlink scheduling information, reference signal resource information referenced for calculating uplink scheduling information, or allocation information of a resource block.

Another embodiment of the present disclosure provides an apparatus for receiving downlink control signalling, applied to a terminal and including a second receiving unit.

The second receiving unit is configured to receive downlink control signalling carrying indication information sent by a base station, where the indication information in the downlink control signalling at least includes one of: information for indicating a receiving manner to the terminal, reference signal resource information referenced for calculating downlink scheduling information, reference signal resource information referenced for calculating uplink scheduling information, or allocation information of a resource block.

An embodiment of the present disclosure provides a base station including a processor and a memory storing processor-executable instructions. When the instructions are executed by the processor, the processor is configured to send downlink control signalling carrying indication information to a terminal. The indication information in the downlink control signalling at least includes one of: information for indicating a receiving manner to the terminal, reference signal resource information referenced for calculating downlink scheduling information, reference signal resource information referenced for calculating uplink scheduling information, or allocation information of a resource block.

An embodiment of the present disclosure provides a terminal including a processor and a memory storing processor-executable instructions. When the instructions are executed by the processor, the processor is configured to receive downlink control signalling carrying indication information sent by a base station. The indication information in the downlink control signalling at least includes one of: information for indicating a receiving manner to the terminal, reference signal resource information referenced for calculating downlink scheduling information, reference signal resource information referenced for calculating uplink scheduling information, or allocation information of a resource block.

The present disclosure further provides a computer-readable storage medium configured to store computer-executable instructions which, when executed by a processor, implement the above-mentioned method for sending downlink control signalling.

The present disclosure further provides a computer-readable storage medium configured to store computer-executable instructions which, when executed by a processor, implement the above-mentioned method for receiving downlink control signalling.

In the embodiments of the present disclosure, a base station sends downlink control signalling carrying indication information to a terminal. The indication information in the downlink control signalling at least includes one of: information for indicating a receiving manner to the terminal, reference signal resource information referenced for calculating downlink scheduling information, reference signal resource information referenced for calculating uplink scheduling information, or allocation information of a resource block. In this way, the terminal can determine the optimal receiving beam to receive data in the downlink transmission according to the downlink control signalling carrying the indication information.

Other aspects can be understood after the drawings and detailed description are read and understood.

BRIEF DESCRIPTION OF DRAWINGS

FIG. 1 is a flowchart 1 of a method for sending downlink control signalling according to an embodiment of the present disclosure;

FIG. 2 is a flowchart 2 of a method for receiving downlink control signalling according to an embodiment of the present disclosure;

FIG. 3 is a structural diagram 1 of an apparatus for sending downlink control signalling according to an embodiment of the present disclosure;

DETAILED DESCRIPTION

Figure 4:
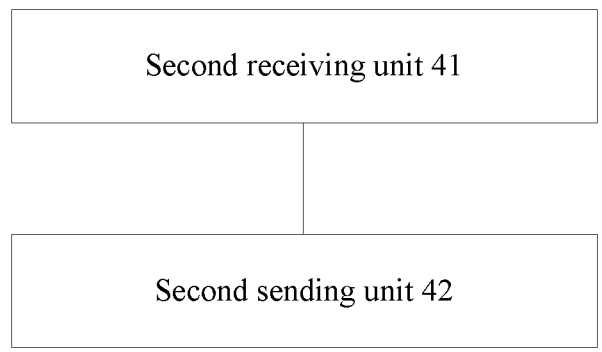
FIG. 4 is a structural diagram 2 of an apparatus for receiving downlink control signalling according to an embodiment of the present disclosure.

Implementation of the embodiments of the present disclosure is described below in detail with reference to the drawings. The drawings are provided for reference only and are not intended to limit the embodiments of the present disclosure.

FIG. 1 is a flowchart of a method for sending downlink control signalling according to an embodiment of the present disclosure. As shown in FIG. 1, the method for sending downlink control signalling includes the step described below.

In step 101, a base station sends downlink control signalling carrying indication information to a terminal. The indication information in the downlink control signalling at least includes one of: information for indicating a receiving manner to the terminal, reference signal resource information referenced for calculating downlink scheduling information, reference signal resource information referenced for calculating uplink scheduling information, or allocation information of a resource block.

In an embodiment of the present disclosure, the receiving manner at least includes one of: a receiving beam, a receiving antenna, a receiving sector, or a receiver.

In an embodiment of the present disclosure, the reference signal resource information includes one of: beam information, antenna port information, or time-frequency resource information.

In an embodiment of the present disclosure, the information for indicating the receiving manner to the terminal includes indication of a receiving manner of the terminal in receiving a physical downlink shared channel or downlink data.

In an embodiment of the present disclosure, a sending manner of the base station in sending the physical downlink shared channel or the downlink data is determined based on a sounding reference signal received by the base station. The sending manner includes one of: a sending beam, a sending antenna, or a sending sector.

Since the beamforming technique is also known as spatial domain filtering, a transmission or receive beam in the beamforming corresponds to a spatial domain transmission or receive filter in spatial domain filtering.

In an implementation mode, the receiving manner at least comprises one of: a receiving beam, a spatial domain receive filter.

In an implementation mode, the sending manner at least comprises one of: a sending beam, a spatial domain transmission filter.

In an embodiment of the present disclosure, the method further includes the steps described below.

The base station receives a sounding reference signal sent on a reference signal resource by the terminal.

The base station determines the downlink scheduling information or the uplink scheduling information based on the received sounding reference signal on the reference signal resource, and sends the downlink scheduling information or the uplink scheduling information to the terminal through the downlink control signalling.

In the embodiment of the present disclosure, the information for indicating the receiving manner to the terminal is determined based on a sounding reference signal received by the base station.

In an embodiment of the present disclosure, the method further includes the step described below.

The base station sends the downlink control signalling to the terminal for multiple times in different subframes or on different time domain symbols.

FIG. 2 is a flowchart of a method for receiving downlink control signalling according to an embodiment of the present disclosure. As shown in FIG. 2, the method for receiving downlink control signalling includes the step described below.

In step 201, a terminal receives downlink control signalling carrying indication information sent by a base station. The indication information in the downlink control signalling at least includes one of: information for indicating a receiving manner to the terminal, reference signal resource information referenced for calculating downlink scheduling information, reference signal resource information referenced for calculating uplink scheduling information, or allocation information of a resource block.

In an embodiment of the present disclosure, the receiving manner at least includes one of: a receiving beam, a receiving antenna, a receiving sector, or a receiver.

In an embodiment of the present disclosure, the reference signal resource information includes one of: beam information, antenna port information, or time-frequency resource information.

In an embodiment of the present disclosure, the information for indicating the receiving manner to the terminal includes indication of a receiving manner of the terminal in receiving a physical downlink shared channel or downlink data.

In an embodiment of the present disclosure, the method further includes the steps described below.

The terminal sends a sounding reference signal to the base station through a reference signal resource.

The terminal receives the downlink scheduling information or the uplink scheduling information determined by the base station based on the sounding reference signal. The downlink scheduling information or the uplink scheduling information is carried in the downlink control signalling.

In an embodiment of the present disclosure, the information for indicating the receiving manner to the terminal is determined based on a sounding reference signal received by the base station.

In an embodiment of the present disclosure, the method further includes the step described below.

The terminal receives the downlink control signalling in different receiving manners in different subframes or on different time domain symbols.

The methods for sending and receiving downlink control signalling in the embodiments of the present disclosure are described below in conjunction with application scenarios.

Embodiment One

A base station and a terminal perform beam training or beam scanning. It is assumed that a beam 1 and a beam 2 are found to be uplink sending beams with good link quality. Since channel reciprocity exists, the beam 1 and the beam 2 are also the optimal receiving beams.

It is assumed that the terminal sends a sounding reference signal in the uplink through the beam 1. The base station calculates and determines downlink scheduling information based on the received sounding reference signal on the beam 1, and sends the downlink scheduling information to the terminal through downlink control signalling. The downlink control signalling includes information for indicating a receiving beam (i.e., information of the beam 1) to the terminal. The information indicates a receiving beam or a receiving beam index, which is used for receiving a physical downlink shared channel or downlink data, to the terminal.

Embodiment Two

A base station and a terminal perform beam training or beam scanning. It is assumed that a beam 1 and a beam 2 are found to be uplink sending beams with good link quality. Since channel reciprocity exists, the beam 1 and the beam 2 are also the optimal receiving beams.

It is assumed that the terminal sends a sounding reference signal in the uplink through the beam 1. The base station calculates and determines downlink scheduling information based on the received sounding reference signal on the beam 1, and sends the downlink scheduling information to the terminal through downlink control signalling. The downlink control signalling includes beam information referenced for calculating the downlink scheduling information, i.e., information of the beam 1. The terminal receives the downlink control signalling to obtain the information of the beam 1 and determines the optimal beam for receiving downlink data based on the information of the beam 1.

Embodiment Three

A base station and a terminal perform beam training or beam scanning. It is assumed that a beam 1 and a beam 2 are found to be uplink sending beams with good link quality. Since channel reciprocity exists, the beam 1 and the beam 2 are also the optimal receiving beams. It is assumed that the terminal sends an uplink sounding reference signal through the beam 1. The base station calculates and determines downlink scheduling information based on the received sounding reference signal on the beam 1, and sends the downlink scheduling information to the terminal through downlink control signalling. The base station sends the downlink control signalling to the terminal for multiple times in different subframes or on different time domain symbols. The terminal receives the downlink control signalling in different receiving manners in different subframes or on different time domain symbols. Thus, the terminal can find the optimal receiving beam.

FIG. 3 is a structural diagram of an apparatus for sending downlink control signalling according to an embodiment of the present disclosure. The apparatus for sending downlink control signalling in this example is applied to a base station. As shown in FIG. 3, the apparatus includes a first sending unit 31.

The first sending unit 31 is configured to send downlink control signalling carrying indication information to a terminal. The indication information in the downlink control signalling at least includes one of: information for indicating a receiving manner to the terminal, reference signal resource information referenced for calculating downlink scheduling information, reference signal resource information referenced for calculating uplink scheduling information, or allocation information of a resource block.

In an embodiment of the present disclosure, the receiving manner at least includes one of: a receiving beam, a receiving antenna, a receiving sector, or a receiver.

In an embodiment of the present disclosure, the reference signal resource information includes one of: beam information, antenna port information, or time-frequency resource information.

In an embodiment of the present disclosure, the information for indicating the receiving manner to the terminal includes indication of a receiving manner of the terminal in receiving a physical downlink shared channel or downlink data.

In an embodiment of the present disclosure, a sending manner of the base station in sending the physical downlink shared channel or the downlink data is determined based on a sounding reference signal received by the base station. The sending manner includes one of: a sending beam, a sending antenna, or a sending sector.

In an embodiment of the present disclosure, the apparatus further includes a first receiving unit 32 and a processing unit 33.

The first receiving unit 32 is configured to receive a sounding reference signal sent on a reference signal resource by the terminal.

The processing unit 33 is configured to determine the downlink scheduling information or the uplink scheduling information based on the received sounding reference signal on the reference signal resource.

The first sending unit 31 is further configured to send the downlink scheduling information or the uplink scheduling information to the terminal through the downlink control signalling.

In an embodiment of the present disclosure, the information for indicating the receiving manner to the terminal is determined based on a sounding reference signal received by the base station.

In an embodiment of the present disclosure, the first sending unit 31 is further configured to send the downlink control signalling to the terminal for multiple times in different subframes or on different time domain symbols.

It should be understood by those skilled in the art that the implementation functions of various units in the apparatus for sending downlink control signalling shown in FIG. 3 can be understood by referring to the relevant description of the foregoing method for sending downlink control signalling. The functions of the various units of the apparatus for sending downlink control signalling shown in FIG. 3 may be implemented by one or more programs running on a processor or by one or more logic circuits.

FIG. 4 is a structural diagram of an apparatus for receiving downlink control signalling according to an embodiment of the present disclosure. The apparatus for receiving downlink control signalling in this example is applied to a terminal. As shown in FIG. 4, the apparatus includes a second receiving unit 41.

The second receiving unit 41 is configured to receive downlink control signalling carrying indication information sent by a base station. The indication information in the downlink control signalling at least includes one of: information for indicating a receiving manner to the terminal, reference signal resource information referenced for calculating downlink scheduling information, reference signal resource information referenced for calculating uplink scheduling information, or allocation information of a resource block.

In an embodiment of the present disclosure, the receiving manner at least includes one of: a receiving beam, a receiving antenna, a receiving sector, or a receiver.

In an embodiment of the present disclosure, the reference signal resource information includes one of: beam information, antenna port information, or time-frequency resource information.

In an embodiment of the present disclosure, the information for indicating the receiving manner to the terminal includes indication of a receiving manner of the terminal in receiving a physical downlink shared channel or downlink data.

In an embodiment of the present disclosure, the apparatus further includes a second sending unit 42.

The second sending unit 42 is configured to send a sounding reference signal to the base station through a reference signal resource.

The second receiving unit 41 is further configured to receive the downlink scheduling information or the uplink scheduling information determined by the base station based on the sounding reference signal. The downlink scheduling information or the uplink scheduling information is carried in the downlink control signalling.

In an embodiment of the present disclosure, the information for indicating the receiving manner to the terminal is determined based on a sounding reference signal received by the base station.

In an embodiment of the present disclosure, the second receiving unit 41 is further configured to receive the downlink control signalling in different receiving manners in different subframes or on different time domain symbols.

It should be understood by those skilled in the art that the implementation functions of various units in the apparatus for receiving downlink control signalling shown in FIG. 4 can be understood by referring to the relevant description of the foregoing method for receiving downlink control signalling. The functions of the various units of the apparatus for receiving downlink control signalling shown in FIG. 4 may be implemented by one or more programs running on a processor or by one or more logic circuits.

Figure 5:
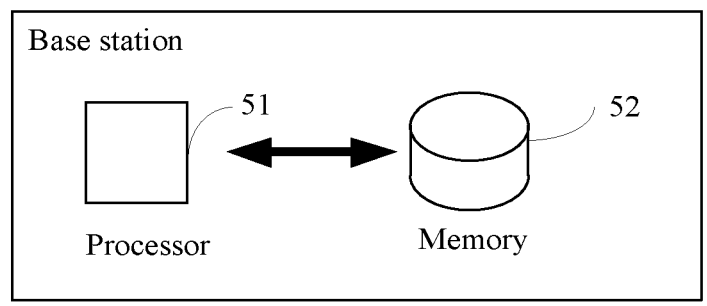
FIG. 5 is a structural diagram of a base station according to an embodiment of the present disclosure.

FIG. 5 is a structural diagram of a base station according to an embodiment of the present disclosure. As shown in FIG. 5, the base station includes a processor 51 and a memory 52 storing instructions, which are executable to the processor 51. When the instructions are executed by the processor 51, the processor 51 is configured to send downlink control signalling carrying indication information to a terminal. The indication information in the downlink control signalling at least includes one of: information for indicating a receiving manner to the terminal, reference signal resource information referenced for calculating downlink scheduling information, reference signal resource information referenced for calculating uplink scheduling information, or allocation information of a resource block.

In an embodiment of the present disclosure, the receiving manner at least includes one of: a receiving beam, a receiving antenna, a receiving sector, or a receiver.

In an embodiment of the present disclosure, the reference signal resource information includes one of: beam information, antenna port information, or time-frequency resource information.

In an embodiment of the present disclosure, the information for indicating the receiving manner to the terminal includes indication of a receiving manner of the terminal in receiving a physical downlink shared channel or downlink data.

In an embodiment of the present disclosure, the processor 51 is further configured to receive a sounding reference signal sent on a reference signal resource by the terminal; and determine the downlink scheduling information or the uplink scheduling information based on the received sounding reference signal on the reference signal resource, and send the downlink scheduling information or the uplink scheduling information to the terminal through the downlink control signalling.

The first sending unit 31, the first receiving unit 32, and the processing unit 33 in the apparatus for sending downlink control signalling shown in FIG. 3 may all be implemented by the processor 51 in the base station.

Figure 6:
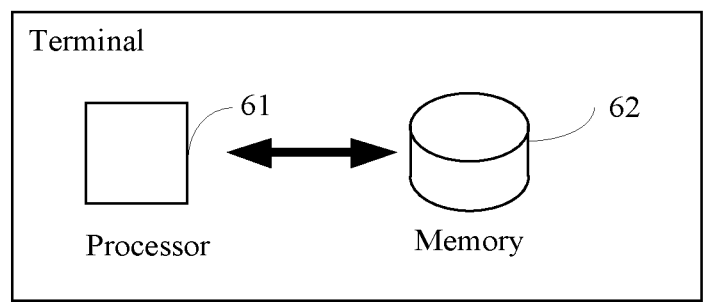
FIG. 6 is a structural diagram of a terminal according to an embodiment of the present disclosure.

FIG. 6 is a structural diagram of a terminal according to an embodiment of the present disclosure. As shown in FIG. 6, the terminal includes a processor 61 and a memory 62 storing instructions which are executable to the processor 61. When the instructions are executed by the processor 61, the processor 61 is configured to receive downlink control signalling carrying indication information sent by a base station. The indication information in the downlink control signalling at least includes one of: information for indicating a receiving manner to the terminal, reference signal resource information referenced for calculating downlink scheduling information, reference signal resource information referenced for calculating uplink scheduling information, or allocation information of a resource block.

In an embodiment of the present disclosure, the receiving manner at least includes one of: a receiving beam, a receiving antenna, a receiving sector, or a receiver.

In an embodiment of the present disclosure, the reference signal resource information includes one of: beam information, antenna port information, or time-frequency resource information.

In an embodiment of the present disclosure, the information for indicating the receiving manner to the terminal includes indication of a receiving manner of the terminal in receiving a physical downlink shared channel or downlink data.

In an embodiment of the present disclosure, the processor 61 is further configured to send a sounding reference signal to the base station through a reference signal resource; and receive the downlink scheduling information or the uplink scheduling information determined by the base station based on the sounding reference signal. The downlink scheduling information or the uplink scheduling information is carried in the downlink control signalling.

The second receiving unit 41 and the second sending unit 42 in the apparatus for receiving downlink control signalling shown in FIG. 4 may both be implemented by the processor 61 in the terminal.

The present disclosure further provides a computer-readable storage medium configured to store computer-executable instructions which, when executed by a processor, implement the above-mentioned method for sending downlink control signalling.

The present disclosure further provides a computer-readable storage medium configured to store computer-executable instructions which, when executed by a processor, implement the above-mentioned method for receiving downlink control signalling.

It should be understood by those skilled in the art that the embodiments of the present disclosure may be provided as methods, systems or computer program products. Therefore, the embodiments of the present disclosure may take the form of a hardware embodiment, a software embodiment, or an embodiment with a combination of software and hardware. The embodiments of the present disclosure may take the form of a computer program product implemented in one or more computer-usable storage media (including, but not limited to, a disk memory and an optical memory) that includes computer-usable program codes.

The present application is described with reference to flowcharts and/or block diagrams of methods, devices (systems) and computer program products according to the embodiments of the present disclosure. It should be understood that each flow and/or block in the flowcharts and/or block diagrams and a combination of flows and/or blocks in the flowcharts and/or block diagrams are implemented by computer program instructions. These computer program instructions can be provided to a general-purpose computer, a special-purpose computer, an embedded processor or a processor of another programmable data processing device to produce a machine so that instructions executed by a computer or a processor of another programmable data processing device produce an apparatus for implementing the functions specified in one or more flows in the flowcharts and/or one or more blocks in the block diagrams.

These computer program instructions can also be stored in a computer-readable memory which can direct a computer or other programmable data processing devices to operate in a particular manner so that the instructions stored in the computer-readable memory produce a manufactured product including an instruction apparatus. The instruction apparatus implements the functions specified in one or more flows in the flowcharts and/or one or more blocks in the block diagrams.

These computer program instructions can also be loaded onto a computer or other programmable data processing devices so that a series of operation steps are performed on the computer or other programmable devices to produce processing implemented by a computer. Therefore, instructions executed on a computer or other programmable devices provide steps for implementing the functions specified in one or more flows in the flowcharts and/or one or more blocks in the block diagrams.

The above are merely embodiments of the present disclosure and are not intended to limit the protection scope of the present disclosure.

INDUSTRIAL APPLICABILITY

With the embodiments of the present disclosure, the terminal can determine the optimal receiving beam to receive data in the downlink transmission according to the downlink control signalling carrying the indication information.

What is claimed is:

1. A method for sending downlink control signaling, comprising:
sending, by a base station, downlink control signaling carrying indication information to a terminal, wherein the indication information in the downlink control signaling at least comprises one of: information for indicating a receiving manner to the terminal, reference signal resource information referenced for calculating downlink scheduling information, reference signal resource information referenced for calculating uplink scheduling information; or, the indication information in the downlink control signaling comprises allocation information of a resource block, and at least one of the information for indicating a receiving manner to the terminal, the reference signal resource information referenced for calculating downlink scheduling information, the reference signal resource information referenced for calculating uplink scheduling information;
wherein the method further comprising:
receiving, by the base station, a sounding reference signal sent on a reference signal resource by the terminal; and
determining, by the base station, the downlink scheduling information or the uplink scheduling information based on the received sounding reference signal on the reference signal resource, and sending the downlink scheduling information or the uplink scheduling information to the terminal through the downlink control signaling.

2. The method for sending downlink control signaling of claim 1, wherein the receiving manner at least comprises one of: a receiving beam, a receiving antenna, a receiving sector, or a receiver.

3. The method for sending downlink control signaling of claim 1, wherein the reference signal resource information comprises one of: beam information, antenna port information, or time-frequency resource information.

4. The method for sending downlink control signaling of claim 1, wherein the information for indicating the receiving manner to the terminal comprises indication of a receiving manner of the terminal in receiving a physical downlink shared channel or downlink data,
wherein the information for indicating the receiving manner to the terminal is determined based on a sending manner of the terminal in sending a sounding reference signal,
wherein the receiving manner at least comprises one of: a receiving beam, a spatial domain receive filter,
wherein the sending manner at least comprises one of: a sending beam, a spatial domain transmission filter.

5. The method for sending downlink control signaling of claim 4, wherein a sending manner of the base station in sending the physical downlink shared channel or the downlink data is determined based on a sounding reference signal received by the base station, wherein the sending manner comprises one of: a sending beam, a sending antenna, or a sending sector.

6. The method for sending downlink control signaling of claim 1, wherein the information for indicating the receiving manner to the terminal is determined based on a sounding reference signal received by the base station.

7. The method for sending downlink control signaling of claim 1, further comprising:
sending, by the base station, the downlink control signaling to the terminal for multiple times in different subframes or on different time domain symbols.

8. A method for receiving downlink control signaling, comprising:
receiving, by a terminal, downlink control signaling carrying indication information sent by a base station, wherein the indication information in the downlink control signaling at least comprises one of: information for indicating a receiving manner to the terminal, reference signal resource information referenced for calculating downlink scheduling information, reference signal resource information referenced for calculating uplink scheduling information; or, the indication information in the downlink control signaling comprises allocation information of a resource block, and at least one of the information for indicating a receiving manner to the terminal, the reference signal resource information referenced for calculating downlink scheduling information, the reference signal resource information referenced for calculating uplink scheduling information;
wherein the method further comprising:
sending, by the terminal, a sounding reference signal to the base station through a reference signal resource; and
receiving, by the terminal, the downlink scheduling information or the uplink scheduling information determined by the base station based on the sounding reference signal, wherein the downlink scheduling information or the uplink scheduling information is carried in the downlink control signaling.

9. An apparatus for receiving downlink control signaling, applied to a terminal, comprising:
a processor; and
a memory storing instructions executable to the processor, wherein when the instructions are executed by the processor, the processor is configured to implement the method of claim 8.

10. The apparatus for receiving downlink control signaling of claim 9, wherein the processor is further configured to receive the downlink control signaling in different receiving manners in different subframes or on different time domain symbols.

11. The apparatus for receiving downlink control signaling of claim 9, wherein the information for indicating the receiving manner to the terminal comprises indication of a receiving manner of the terminal in receiving a physical downlink shared channel or downlink data,
wherein the information for indicating the receiving manner to the terminal is determined based on a sending manner of the terminal in sending a sounding reference signal,
wherein the receiving manner at least comprises one of: a receiving beam, a spatial domain receive filter,
wherein the sending manner at least comprises one of: a sending beam, a spatial domain transmission filter.

12. The method for receiving downlink control signaling of claim 8, wherein the information for indicating the receiving manner to the terminal comprises indication of a receiving manner of the terminal in receiving a physical downlink shared channel or downlink data, wherein the information for indicating the receiving manner to the terminal is determined based on a sending manner of the terminal in sending a sounding reference signal, wherein the receiving manner at least comprises one of: a receiving beam, a spatial domain receive filter, wherein the sending manner at least comprises one of: a sending beam, a spatial domain transmission filter.

13. An apparatus for sending downlink control signaling, applied to a base station, comprising:

a processor; and a memory storing instructions executable to the processor, wherein when the instructions are executed by the processor, the processor is configured to send downlink control signaling carrying indication information to a terminal, wherein the indication information in the downlink control signaling at least comprises one of: information for indicating a receiving manner to the terminal, reference signal resource information referenced for calculating downlink scheduling information, reference signal resource information referenced for calculating uplink scheduling information; or, the indication information in the downlink control signaling comprises allocation information of a resource block, and at least one of the information for indicating a receiving manner to the terminal, the reference signal resource information referenced for calculating downlink scheduling information, the reference signal resource information referenced for calculating uplink scheduling information;

wherein the processor is further configured to: receive sounding reference signal sent on a reference signal resource by the terminal; and determine the downlink scheduling information or the uplink scheduling information based on the received sounding reference signal on the reference signal resource, and send the downlink scheduling information or the uplink scheduling information to the terminal through the downlink control signaling.

14. The apparatus for sending downlink control signaling of claim 13, wherein the information for indicating the receiving manner to the terminal comprises indication of a receiving manner of the terminal in receiving a physical downlink shared channel or downlink data, wherein the information for indicating the receiving manner to the terminal is determined based on a sending manner of the terminal in sending a sounding reference signal, wherein the receiving manner at least comprises one of: a receiving beam, a spatial domain receive filter, wherein the sending manner at least comprises one of: a sending beam, a spatial domain transmission filter.

15. The apparatus for sending downlink control signaling of claim 14, wherein a sending manner of the base station in sending the physical downlink shared channel or the downlink data is determined based on a sounding reference signal received by the base station, wherein the sending manner comprises one of: a sending beam, a sending antenna, or a sending sector.

16. The apparatus for sending downlink control signaling of claim 13, wherein the information for indicating the receiving manner to the terminal is determined based on a sounding reference signal received by the base station.

17. The apparatus for sending downlink control signaling of claim 13, wherein the processor is further configured to send the downlink control signaling to the terminal for multiple times in different subframes or on different time domain symbols.

\* \* \* \* \*